(12) United States Patent
Lee et al.

(10) Patent No.: US 8,774,028 B2
(45) Date of Patent: Jul. 8, 2014

(54) METHOD AND APPARATUS FOR ESTIMATING DELAY OF BUFFER DATA OF UE IN A MOBILE COMMUNICATION SYSTEM

(75) Inventors: Neung-Hyung Lee, Seongnam-si (KR); Sung-Oh Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 13/085,331

(22) Filed: Apr. 12, 2011

(65) Prior Publication Data

US 2011/0249583 A1 Oct. 13, 2011

(30) Foreign Application Priority Data

Apr. 12, 2010 (KR) ........................ 10-2010-0033178

(51) Int. Cl.
*H04W 72/12* (2009.01)

(52) U.S. Cl.
USPC .......................................................... 370/252

(58) Field of Classification Search
USPC .......................................................... 370/252
See application file for complete search history.

(56) References Cited

U.S. PATENT DOCUMENTS

| 2005/0083943 | A1* | 4/2005 | Lee et al. | 370/395.4 |
| 2011/0128859 | A1* | 6/2011 | Bucknell et al. | 370/241 |
| 2011/0243014 | A1* | 10/2011 | Lee et al. | 370/252 |

* cited by examiner

*Primary Examiner* — Melvin Marcelo

(57) ABSTRACT

A method and apparatus estimate a delay of buffer data of a User Equipment (UE) in a mobile communication system. A message comprising the size of buffer data is received from a UE. The size of the buffer data of the UE is distributed into a plurality of groups based on a time point of receiving the message comprising the size of the buffer data of the UE. A delay for each of the plurality of groups is estimated using a time interval of execution of delay estimation for the buffer data of the UE.

20 Claims, 10 Drawing Sheets

METHOD AND APPARATUS FOR ESTIMATING DELAY OF BUFFER DATA OF UE IN A MOBILE COMMUNICATION SYSTEM

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Apr. 12, 2010 and assigned Serial No. 10-2010-0033178, the contents of which are herein incorporated by reference.

TECHNICAL FIELD OF THE INVENTION

The present invention relates to a method and apparatus for estimating a delay of buffer data of a User Equipment (UE) in a mobile communication system. More particularly, the present invention relates to a method and apparatus for estimating a delay of buffer data of a UE using a Buffer Status Report (BSR) message of the UE in a mobile communication system.

BACKGROUND OF THE INVENTION

In the Long Term Evolution (LTE) system, a next-generation mobile communication system, a UE reports a buffer status for uplink (UL) data to an evolved Node B (eNB) before transmitting the UL data to the eNB. That is, in the LTE system, the UE sends a BSR message indicating the size of the UL data to the eNB, whereby the eNB allocates UL resources to the UE, enabling UL data transmission of the UE.

In the LTE system, one user UE includes a plurality of logical channels and manages a buffer by each logical channel. Accordingly, the BSR message includes buffer status information on a Logical Channel Group (LCG) that is a group of one or more logical channels. This is to decrease an overhead resulting from transmission of the BSR message.

The BSR message may be divided into a short BSR and a long BSR according to the included information. FIGS. 1A and 1B illustrate constructions of the BSR message. FIG. 1A illustrates the short BSR including a buffer status for one LCG. The short BSR is composed of information of an Identifier (LCG ID) of the one LCG and the size of a buffer corresponding to the LCG. FIG. 1B illustrates the long BSR including a buffer status for four LCGs. The long BSR is composed of information of the size of a buffer of each of the four LCGs. Here, the number of LCGs included in the long BSR is fixed to '4', so no problem occurs although the long BSR does not include information of an ID of each LCG.

An eNB performs UL scheduling for a corresponding UE using the above BSR message. Here, the eNB needs delay information on buffer data of each UE so as to meet a Quality of Service (QoS) level required by a corresponding service. But, as illustrated in FIGS. 1A and 1B, the BSR message of the UE includes only the buffer size information, and therefore the eNB has to perform a separate process of estimating a delay of buffer data using the BSR message.

But, the standard does not specify a scheme of estimating the delay of the buffer data of the UE. Also, when an error occurs while estimating the delay of the buffer data of the UE, this causes the performance of a scheduling algorithm to deteriorate. Thus, there is a need to provide an accurate delay estimation technique.

SUMMARY OF THE INVENTION

To address the above-discussed deficiencies of the prior art, it is a primary object to provide at least the advantages below.

Accordingly, one aspect of the present invention is to provide a method and apparatus for estimating a delay of buffer data of a User Equipment (UE) in a mobile communication system.

Another aspect of the present invention is to provide a method and apparatus for estimating a delay of buffer data of a UE using a UE buffer data delay estimation time point and delay estimation execution time interval in a mobile communication system.

Another aspect of the present invention is to provide a method and apparatus for, based on a time point when a Buffer Status Report (BSR) message is received from a UE, grouping the size of buffer data of the UE and estimating a delay of buffer data corresponding to each group in a mobile communication system.

The above aspects are achieved by providing a method and apparatus for estimating a delay of buffer data of a UE in a mobile communication system.

According to one aspect of the present invention, a method for estimating a delay of buffer data of a UE in an evolved Node B (eNB) of a mobile communication system is provided. The method includes receiving a message including the size of buffer data from a UE. The size of the buffer data of the UE is distributed into a plurality of groups based on a time point of receiving the message including the size of the buffer data of the UE. A delay for each of the plurality of groups is estimated using a time interval of execution of delay estimation for the buffer data of the UE.

According to another aspect of the present invention, an apparatus for estimating a delay of buffer data of a UE in an eNB of a mobile communication system is provided. The apparatus includes a transmitter/receiver and a scheduler. The transmitter/receiver receives a message including the size of buffer data from a UE. The scheduler distinguishes the size of the buffer data of the UE into a plurality of groups based on a time point of receiving the message including the size of the buffer data of the UE and estimates a delay for each of the plurality of groups using a time interval of execution of delay estimation for the buffer data of the UE.

According to yet another aspect of the present invention, an apparatus for estimating a delay of buffer data of a UE in an eNB of a mobile communication system is provided. The apparatus includes a transceiver, a scheduler, and a buffer data delay estimator in the scheduler. The transceiver receives a message comprising the size of buffer data from a UE. The scheduler performs scheduling for UEs receiving services from the eNB. The buffer data delay estimator distributes the size of the buffer data of the UE into a plurality of groups based on a time point of receiving the message comprising the size of the buffer data of the UE and estimates a delay for each of the plurality of groups using a time interval of delay estimation for the buffer data of the UE.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

Figure 1A:
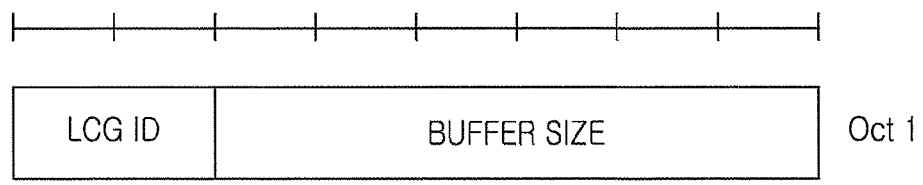
FIGS. 1A and 1B are diagrams illustrating a construction of a general Buffer Status Report (BSR) message.
Figure 1B:
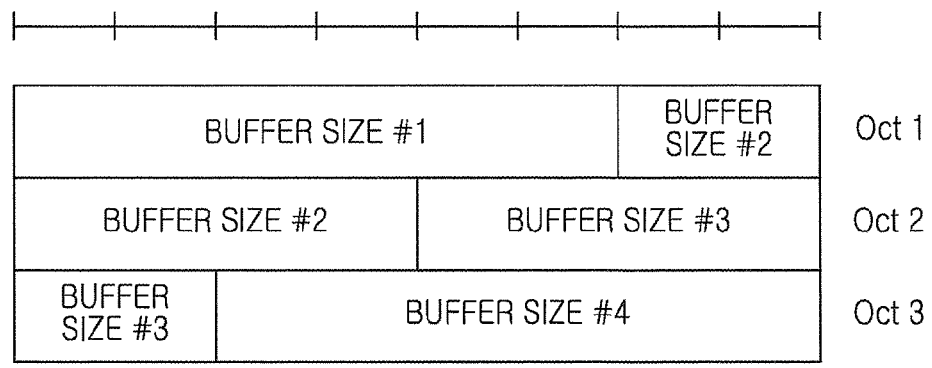

FIGS. 2 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Preferred embodiments of the present invention will be described below with reference to the accompanying drawings. In the following description, well-known functions or constructions are not described in detail as they would obscure the invention in unnecessary detail.

Below, embodiments of the present invention provide a technology for, based on a User Equipment (UE) Buffer Status Report (BSR) time point, grouping the size of buffer data of a UE and estimating a delay of buffer data corresponding to each group using a delay estimation execution time interval in an evolved Node B (eNB) of a mobile communication system. Below, for the sake of description convenience, a description is made for grouping the size of buffer data of a UE into two groups and grouping the size of the buffer data of the UE into three groups. However, the embodiments of the present invention are generally applicable to grouping the size of buffer data of a UE into a plurality of groups. Also, in the following description, a BSR message of a UE may be similar in construction as that of the conventional art.

First, according to embodiments of the present invention, an eNB analyzes a BSR message received from a UE and determines the size of buffer data of the UE. Based on a time point at which a delay of the buffer data of the UE is estimated or a time point at which the BSR message is received, the eNB groups the size of the buffer data of the UE into two or three groups and estimates a delay of the buffer data of each group. The eNB estimates a delay for each group when a predetermined period is satisfied instead of estimating the delay for each group every time point of receiving the BSR message. That is, in the embodiments of the present invention, although the BSR message is received, when it is not a delay estimation period, the eNB performs an operation of increasing a previously estimated delay instead of estimating a delay for each group. Here, for the sake of description convenience, a description is made by way of an example of when a BSR message is received every delay estimation period, but the embodiments of the present invention are similarly applicable even to a situation in which the BSR message is received randomly.

Also, in the embodiments of the present invention, it is assumed that in the eNB, delay estimation for buffer data of a UE is performed at every time point (t−n), and it is assumed that a time duration between 't−n' and 't−(n−1)' is '$T_{t-(n-1)}$'. For example, it is assumed that a time duration between 't−2' and 't−1' is '$T_{t-1}$', and a time duration between the 't−1' and 't' is '$T_t$'.

Figure 2:
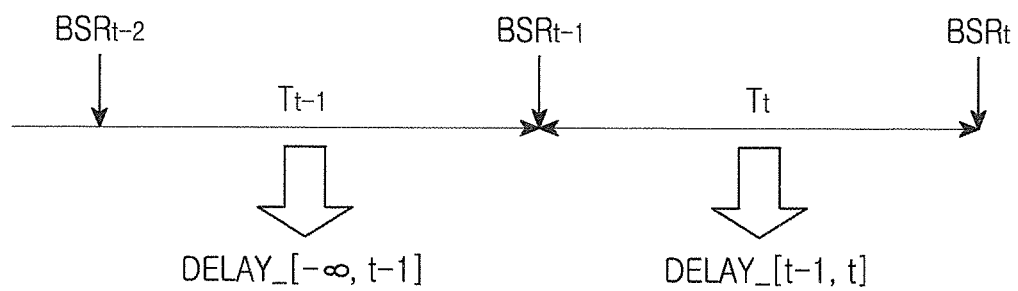
FIG. 2 illustrates the relationships of respective variables for grouping the size of buffer data of a User Equipment (UE) into two groups and estimating a delay for each group in an evolved Node B (eNB) of a mobile communication system according to an embodiment of the present invention.
Figure 3:
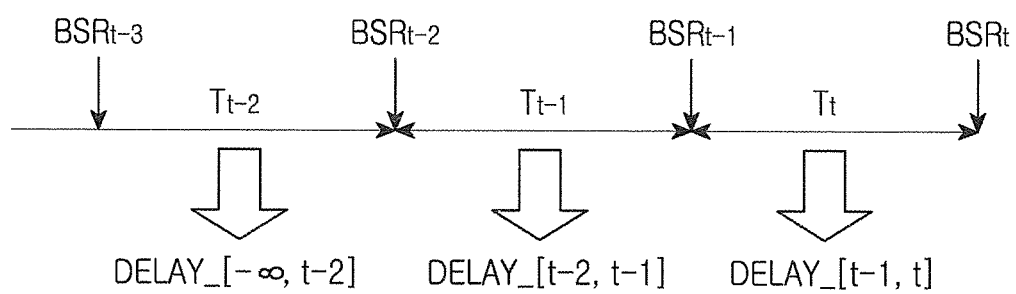
FIG. 3 illustrates the relationships of respective variables for grouping the size of buffer data of a UE into three groups and estimating a delay for each group in an eNB of a mobile communication system according to an embodiment of the present invention.

In order to estimate a delay for each group, the eNB may set variables as illustrated in FIGS. 2 and 3 below.

FIG. 2 illustrates the relationships of respective variables for grouping the size of buffer data of a UE into two groups and estimating a delay for each group in an eNB of a mobile communication system according to an embodiment of the present invention.

Referring to FIG. 2, based on a BSR message ($BSR_t$) received at a time point (t), an eNB distinguishes the size of buffer data reported before the time point (t) and not scheduled until the time point (t) and the size of buffer data newly reported at the time point (t) and generates two buffer data groups. Here, for the sake of description convenience, the size of buffer data reported before the time point (t) and remaining without being scheduled until a current time point is called a first group, and the size of buffer data newly reported through the BSR message ($BSR_t$) received at the time point (t) is called a second group.

The sizes of the buffer data corresponding to the first group and second group are determined according to Equation 1 below.

$$R_t = \max(B_{t-1} - S_t, 0)$$

$$N_t = \max(B_t - R_t, 0) \qquad [\text{Eqn. 1}]$$

Here, the '$R_t$' represents the size of buffer data corresponding to the first group, and the '$N_t$' represents the size of buffer data corresponding to the second group. Also, the '$S_t$' represents the size of buffer data that the eNB schedules during '$T_t$', the '$B_t$' represents the size of buffer data of a UE included in a BSR message received at a current time point (t), and the '$B_{t-1}$' represents the size of buffer data of a UE included in a BSR message received at a previous time point (t-1).

Also, the eNB may estimate a delay for each of the first group and second group using the '$T_{t-1}$' and the '$T_t$'. Here, the delay for each of the first group and second group is estimated according to Equation 2 below.

$$\text{Delay}_{-[-\infty,t-1]} = T_{t-1}/2 + T_t$$

$$\text{Delay}_{-[t-1,t]} = T_t/2 \quad [\text{Eqn. 2}]$$

Here, the '$\text{Delay}_{-[-\infty,t-1]}$' represents the delay for the first group, and the '$\text{Delay}_{-[t-1,t]}$' represents the delay for the second group.

FIG. 3 illustrates the relationships of respective variables for grouping the size of buffer data of a UE into three groups and estimating a delay for each group in an eNB of a mobile communication system according to an embodiment of the present invention.

Referring to FIG. 3, based on a time point (t) and a time point (t-1), an eNB distinguishes the size of buffer data reported before the time point (t-1) and not scheduled until the time point (t), the size of buffer data newly reported at the time point (t-1) and not scheduled until the time point (t), and the size of buffer data newly reported at the time point (t) and generates three buffer data groups. Here, for the sake of description convenience, the size of the buffer data reported before the time point (t-1) and remaining without being scheduled until the time point (t) is called a first group, the size of the buffer data reported starting from the time point (t-1) before the time point (t) and remaining without being scheduled until the time point (t) is called a second group, and the size of the buffer data newly reported at the time point (t) is called as a third group.

The sizes of buffer data corresponding to the first to third groups are determined according to Equation 3 below.

$$R1_t = \max(B_{t-2} - S_{t-1} - S_t, 0)$$

$$R2_t = \max(B_{t-1} - R1_t - S_t, 0)$$

$$N_t = \max(B_t - R_t, 0) \quad [\text{Eqn. 3}]$$

Here, the '$R1_t$' represents the size of buffer data corresponding to the first group, the '$R2_t$' represents the size of buffer data corresponding to the second group, and the '$N_t$' represents the size of buffer data corresponding to the third group. Also, the '$B_t$' represents the size of buffer data reported through a $BSR_t$ received at the time point (t), the '$B_{t-1}$' represents the size of buffer data reported through a $BSR_{t-1}$ received at the time point (t-1), and the '$B_{t-2}$' represents the size of buffer data reported through a $BSR_{t-2}$ received at a time point (t-2). Also, the '$S_t$' represents the size of buffer data that the eNB schedules during the '$T_t$', and the '$S_{t-1}$' represents the size of buffer data that the eNB schedules during the '$T_{t-1}$'.

Also, the eNB may estimate a delay for each of the first group to third group using the '$T_{t-2}$', '$T_{t-1}$', and '$T_t$'. According to an embodiment, the delay for each of the first group to third group is estimated according to Equation 4 below.

$$\text{Delay}_{-[-\infty,t-2]} = T_{t-2} + T_{t-1} + T_t$$

$$\text{Delay}_{-[t-2,t-1]} = T_{t-1}/2 + T_t$$

$$\text{Delay}_{-[t-1,t]} = T_t/2 \quad [\text{Eqn. 4}]$$

Here, the '$\text{Delay}_{-[-\infty,t-2]}$' represents the delay for the first group, the '$\text{Delay}_{-[t-2,t-1]}$' represents the delay for the second group, and the '$\text{Delay}_{-[t-1,t]}$' represents the delay for the third group.

Figure 4:
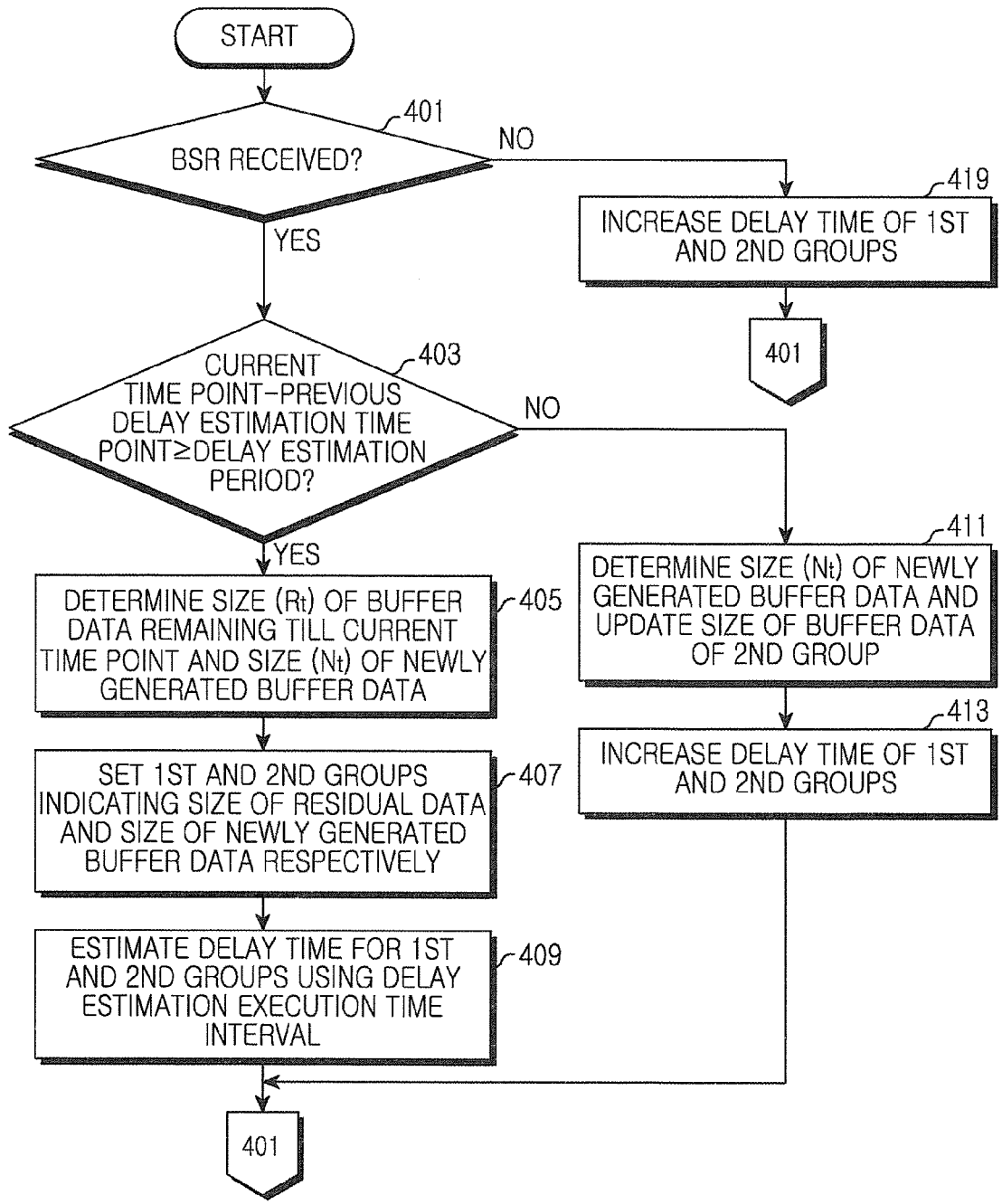
FIG. 4 illustrates a process of grouping the size of buffer data of a UE into two groups and estimating a delay for each group in an eNB of a mobile communication system according to an embodiment of the present invention.

FIG. 4 illustrates a process of grouping the size of buffer data of a UE into two groups and estimating a delay for each group in an eNB of a mobile communication system according to an embodiment of the present invention.

Referring to FIG. 4, in step 401, the eNB determines whether a BSR message is received from a UE.

If the BSR message is received, the eNB proceeds to step 403 and determines whether a difference between a current time point (t) and a previous delay estimation time point (t-1) is greater than or equal to a delay estimation period. At this time, if the eNB has not yet performed delay estimation for the UE beforehand, the eNB may proceed to step 405 below.

When the difference between the current time point (t) and the previous delay estimation time point (t-1) is greater than or equal to the delay estimation period, the eNB proceeds to step 405 and determines the size ($R_t$) of buffer data reported before and remaining without being scheduled until the current time point (t) and the size ($N_t$) of buffer data newly generated based on the BSR message of step 401. Here, the size ($R_t$) of the residual buffer data and the size ($N_t$) of the newly generated buffer data may be determined according to Equation 1 above.

After that, in step 407, the eNB sets the size ($R_t$) of the residual buffer data as a first group and sets the size ($N_t$) of the newly generated buffer data as a second group. Then, the eNB proceeds to step 409 and estimates a delay time for each of the first group and second group using a delay estimation execution time interval of the eNB. Here, the delay time for each of the first group and second group is estimated according to Equation 2 above. After that, the eNB returns to step 401.

In contrast, when the difference between the current time point (t) and the previous delay estimation time point (t-1) is less than the delay estimation period, in step 411, the eNB determines the size ($N_t$) of buffer data newly generated based on the BSR message of step 401, updating the size ($N_t$) of the buffer data of the second group. Here, the size ($N_t$) of the newly generated buffer data may be determined according to Equation 1 above.

In step 413, the eNB increases a delay time for each of the first group and second group and then returns to step 401. At this time, the delay time for the first group and second group may increase depending on the difference between the previous delay estimation time point (t-1) and the current time point (t) or may increase depending on how many Transmission Time Intervals (TTIs) have lapsed from the previous delay estimation time point (t-1).

In contrast, when it is determined that the BSR message is not received in step 401, the eNB proceeds to step 419 and increases the delay time for the first group and second group. At this time, the delay time for the first group and second group may increase depending on the difference between the previous delay estimation time point (t-1) and the current time point (t) or may increase depending on how many TTIs have lapsed from the previous delay estimation time point (t-1).

After that, the eNB returns to step 401.

Although not illustrated in FIG. 4, the eNB determines whether data scheduling has been performed every TTI and, when the data scheduling has been performed, the eNB may update the sizes of buffer data of first and second groups according to the size of scheduled data.

Figure 5:
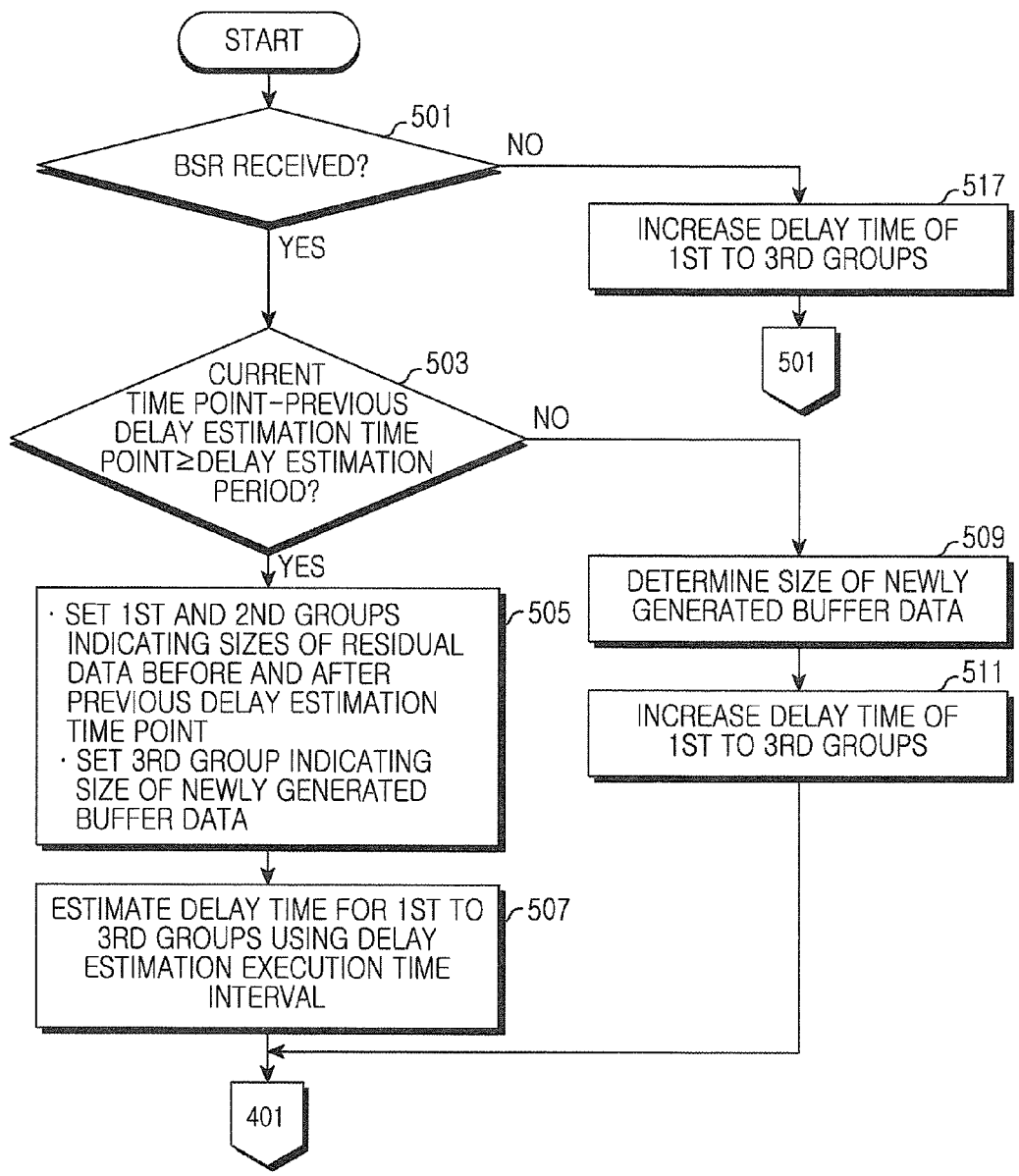
FIG. 5 illustrates a process of grouping the size of buffer data of a UE into three groups and estimating a delay for each group in an eNB of a mobile communication system according to an embodiment of the present invention.

FIG. 5 illustrates a process of grouping the size of buffer data of a UE into three groups and estimating a delay for each group in an eNB of a mobile communication system according to an embodiment of the present invention.

Referring to FIG. 5, in step 501, the eNB determines whether a BSR message is received from a UE.

If the BSR message is received, the eNB proceeds to step 503 and determines whether a difference between a current time point (t) and a previous delay estimation time point (t−1) is greater than or equal to a delay estimation period. At this time, if the eNB has not yet performed delay estimation for the UE, the eNB may proceed to step 505 below.

When the difference between the current time point (t) and the previous delay estimation time point (t−1) is greater than or equal to the delay estimation period, in step 505, the eNB obtains the sizes of buffer data remaining until the current time point (t) among buffer data generated based on the previous delay estimation time point (t−1), respectively, and sets the sizes of the residual buffer data as a first group and a second group, respectively. Based on the BSR message received at the current time point (t) in step 501, the eNB determines the size of newly generated buffer data and sets the size of the newly generated buffer data as a third group. Here, the sizes of the buffer data corresponding to the first group to third group may be determined according to Equation 3 above.

In step 507, the eNB estimates a delay time for the first group to third group using a delay estimation execution time interval of the eNB. Here, the delay time for each of the first group to third group is estimated according to Equation 4 above. Next, the eNB returns to step 501.

In contrast, when the difference between the current time point (t) and the previous delay estimation time point (t−1) is less than the delay estimation period, in step 509, the eNB determines the size ($N_t$) of buffer data newly generated based on the BSR message of step 501, updating the size ($N_t$) of the newly generated buffer data of the third group. Here, the size ($N_t$) of the newly generated buffer data may be determined according to Equation 3 above.

In step 511, the eNB increases the delay time for each of the first group to third group and then returns to step 501. At this time, the delay time for each of the first group to third group may increase depending on the difference between the previous delay estimation time point (t−1) and the current time point (t) or may increase depending on how many TTIs have lapsed from the previous delay estimation time point (t−1).

In contrast, when it is determined that the BSR message is not received in step 501, the eNB proceeds to step 517 and increases the delay time for each of the first group to third group. At this time, the delay time for each of the first group to third group may increase depending on the difference between the previous delay estimation time point (t−1) and the current time point (t) or may increase depending on how many TTIs have lapsed from the previous delay estimation time point (t−1).

After that, the eNB returns to step 501.

Although not illustrated in FIG. 5, the eNB determines whether data scheduling has been performed every TTI, and when the data scheduling has been performed, the eNB may update the size of buffer data of each of first to third groups according to the size of scheduled data.

Figure 6:
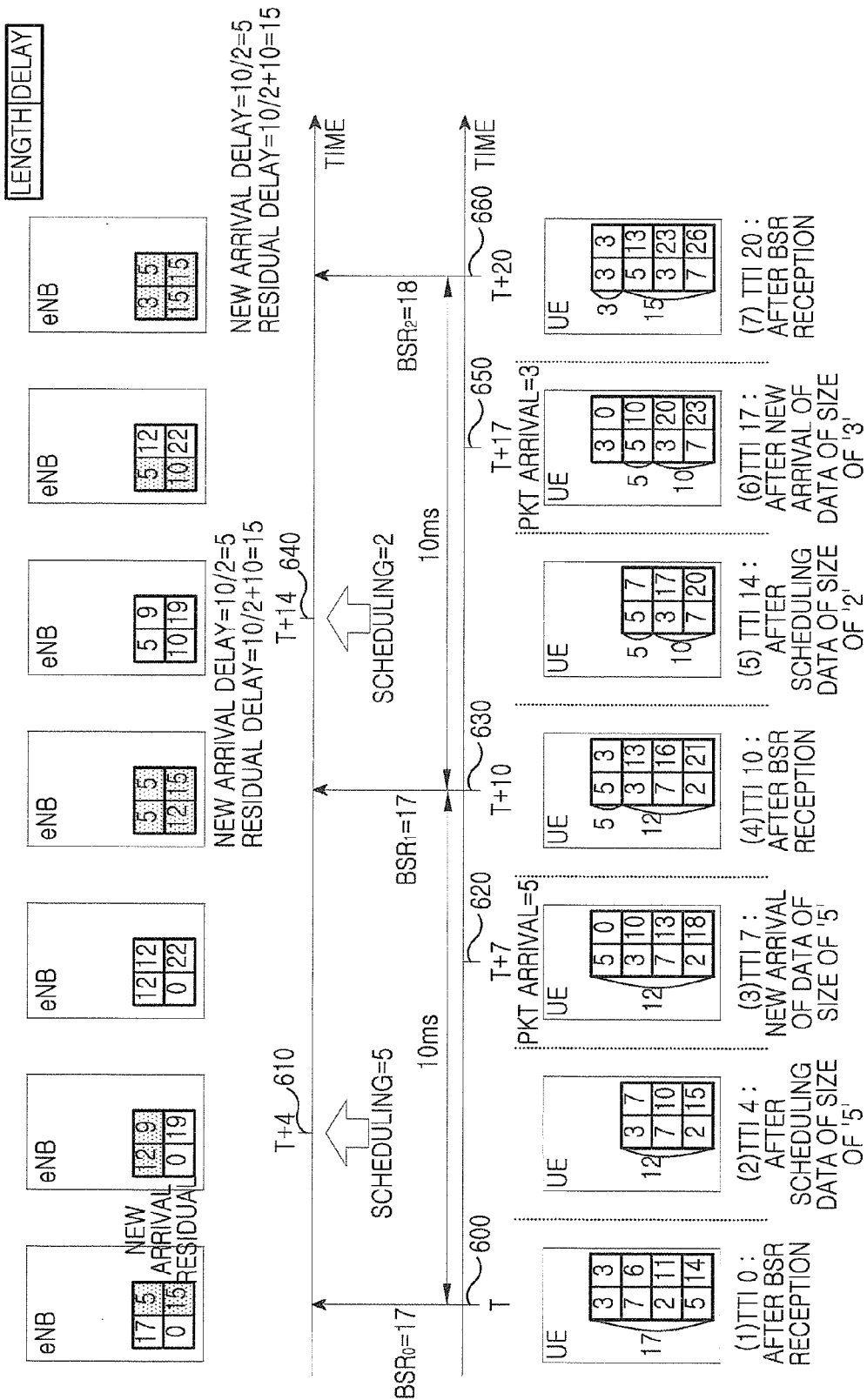
FIG. 6 is a diagram illustrating an example of grouping the size of buffer data of a UE into two groups and estimating a delay for each group in an eNB of a mobile communication system according to an embodiment of the present invention.

FIG. 6 illustrates an example of grouping the size of buffer data of a UE into two groups and estimating a delay for each group in an eNB of a mobile communication system according to an embodiment of the present invention. Here, assuming that a transmission/reception period of a BSR message is equal to '10 ms', a buffer state of the UE and a buffer state estimated in the eNB are illustrated.

First, as shown in FIG. 6(1), if the UE sends a BSR message ($BSR_0$=17) indicating a buffer data size of '17' to the eNB at 'T' (600), the eNB sets a first group indicating the size of residual buffer data to '0' because of having no previously received buffer data and sets a second group indicating the size of newly generated buffer data to '17', and then the eNB estimates a delay for the first group as '15' (=10/2+10) and estimates a delay for the second group as '5' (=10/2), respectively.

After that, as shown in FIG. 6(2), when the eNB schedules buffer data corresponding to a buffer data size of '5' at 'T+4' (610), the eNB updates the size of the buffer data of the second group from '17' to '12', and increases the delays for the first group and second group by '4', respectively. At this time, according to the scheduling of the eNB, the UE transmits the buffer data corresponding to the buffer data size of '5' to the eNB, thus allowing the eNB to update the size of the buffer data of the second group from '17' to '12'.

Next, as shown in FIG. 6(3), if new buffer data of a size of '5' is generated in the UE at 'T+7' (620), the size of buffer data of the UE is updated. But, at this time, because the eNB has not received a BSR message, the eNB cannot recognize a change of the size of the buffer data of the UE.

After that, as shown in FIG. 6(4), if the UE sends a BSR message ($BSR_1$=17) indicating a buffer data size of '17' to the eNB at 'T+10' (630), the eNB sets a size of '12' of buffer data received before and remaining without being scheduled until the 'T+10' (630), as a first group, and sets a size of '5' of newly generated buffer data as a second group, and then the eNB estimates a delay for the first group as '15' (=10/2+10) and estimates a delay for the second group as '5' (=10/2), respectively.

After that, as shown in FIG. 6(5), when the eNB schedules buffer data corresponding to a buffer data size of '2' at 'T+14' (640), the eNB updates the size of the buffer data of the first group from '12' to '10' and increases the delays for the first group and second group by '2', respectively. At this time, according to the scheduling of the eNB, the UE transmits the buffer data corresponding to the buffer data size of '2' to the eNB, thus allowing the eNB to update the size of the buffer data of the first group from '12' to '10'.

Next, as shown in FIG. 6(6), if new buffer data of a size of '3' is generated in the UE at 'T+17' (650), the size of buffer data of the UE is updated. But, at this time, because the eNB has not received a BSR message, the eNB cannot recognize a change of the size of the buffer data of the UE.

After that, as shown in FIG. 6(7), if the UE sends a BSR message ($BSR_2$=18) indicating a buffer data size of '18' to the eNB at 'T+20' (660), the eNB sets a size of '15' of buffer data received before and remaining without being scheduled until the 'T+20' (660), as a first group, and sets a size of '3' of newly generated buffer data as a second group, and then the eNB estimates a delay for the first group as '15' (=10/2+10) and a delay for the second group as '5' (=10/2), respectively.

Figure 7:
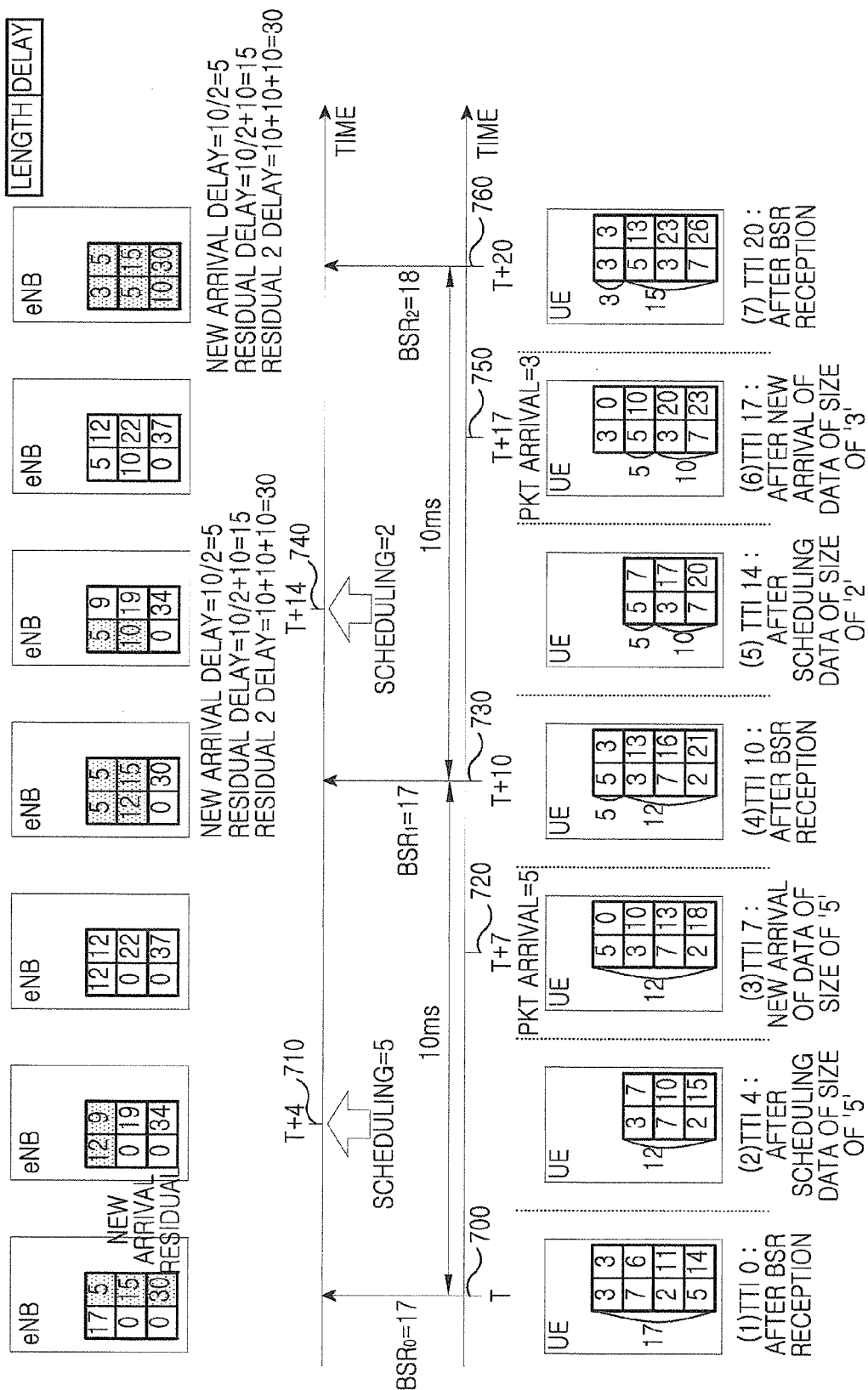
FIG. 7 is a diagram illustrating an example of grouping the size of buffer data of a UE into three groups and estimating a delay for each group in an eNB of a mobile communication system according to an embodiment of the present invention.

FIG. 7 illustrates an example of grouping the size of buffer data of a UE into three groups and estimating a delay for each group in an eNB of a mobile communication system according to an embodiment of the present invention.

First, as shown in FIG. 7(1), if the UE sends a BSR message ($BSR_0$=17) indicating a buffer data size of '17' to the eNB at 'T' (700), the eNB sets a first group and a second group indicating the sizes of residual buffer data to '0', respectively, because of having no previously received buffer data and sets a third group indicating the size of newly generated buffer data to '17', and then the eNB estimates a delay for the first group as '30' (=10+10+10), a delay for the second group as '15' (=10/2+10), and a delay for the third group as '5' (=10/2), respectively.

After that, as shown in FIG. 7(2), when the eNB schedules buffer data corresponding to as much as a buffer data size of '5' at 'T+4' (710), the eNB updates the size of the buffer data of the third group from '17' to '12' and increases the delays for the first group to third group by '4', respectively. At this time, according to the scheduling of the eNB, the UE transmits the buffer data corresponding to the buffer data size of '5' to the eNB, thus allowing the eNB to update the size of the buffer data of the third group from '17' to '12'.

Next, as shown in FIG. 7(3), if new buffer data of a size of '5' is generated in the UE at 'T+7' (720), the size of buffer data of the UE is updated. But, at this time, because the eNB has not received a BSR message, the eNB cannot recognize a change of the size of the buffer data of the UE.

After that, as shown in FIG. 7(4), if the UE sends a BSR message ($BSR_1=17$) indicating a buffer data size of '17' to the eNB at 'T+10' (730), the eNB maintains, as '0', a first group indicating the size of buffer data received before the 'T' (700) and remaining without being scheduled until the 'T+10' (730), sets to '12' a second group indicating the size of buffer data received at the 'T' (700) and remaining without being scheduled until the 'T+10' (730), and sets to '5' a third group indicating the size of new buffer data generated at the 'T+10' (730), and then the eNB estimates delays for the first group, second group, and third group as '30', '15', and '5', respectively.

After that, as shown in FIG. 7(5), when the eNB schedules buffer data corresponding to as much as a buffer data size of '2' at 'T+14' (740), the eNB maintains the sizes of the buffer data of the first group and third group as '0' and '5', respectively, and updates the size of the buffer data of the second group from '12' to '10', and then the eNB increases the delays for the first group to third group by '4', respectively. At this time, according to the scheduling of the eNB, the UE transmits the buffer data corresponding to the buffer data size of '2' to the eNB, thus allowing the eNB to update the size of the buffer data of the second group from '12' to '10'.

Next, as shown in FIG. 7(6), if new buffer data of a size of '3' is generated in the UE at 'T+17' (750), the size of buffer data of the UE is updated. But, at this time, because the eNB has not received a BSR message, the eNB cannot recognize a change of the size of the buffer data of the UE.

After that, as shown in FIG. 7(7), if the UE sends a BSR message ($BSR_2=18$) indicating a buffer data size of '18' to the eNB at 'T+20' (760), the eNB updates as '10' a first group indicating the size of buffer data received before the 'T+10' (730) and remaining without being scheduled until the 'T+20' (760), updates as '5' a second group indicating the size of buffer data received before the 'T+10' (730) and remaining without being scheduled until the 'T+20' (760), and sets to '3' a third group indicating the size of new buffer data generated at the 'T+20' (760), and then the eNB estimates delays for the first group, second group, and third group as '30', '15', and '5', respectively.

Figure 8:
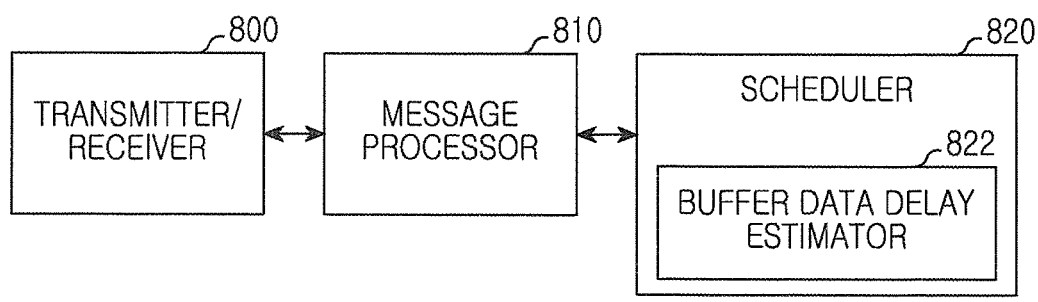
FIG. 8 is a block diagram of an eNB in a mobile communication system according to an embodiment of the present invention.

FIG. 8 is a block diagram of an eNB in a mobile communication system according to an embodiment of the present invention.

Referring to FIG. 8, the eNB includes a transmitter/receiver 800, a message processor 810, and a scheduler 820. The scheduler 820 includes a buffer data delay estimator 822.

The transmitter/receiver 800 down converts a Radio Frequency (RF) wireless signal received through an antenna into a baseband signal and provides the baseband signal to the message processor 810 and up converts a baseband signal provided from the message processor 810 into an RF signal and transmits the RF signal through the antenna.

The message processor 810 analyzes a signal provided from the transmitter/receiver 800 and provides to the scheduler 820. According to a signal provided from the scheduler 820, the message processor 810 generates a message and provides the message to the transmitter/receiver 800.

The scheduler 820 performs scheduling for UEs receiving services from the eNB and allocates uplink (UL) and downlink (DL) resources to the UEs. Particularly, by including the buffer data delay estimator 822, the scheduler 820 performs a function of, after grouping the size of buffer data included in a BSR message of a UE into a plurality of groups, estimating a delay for each group. The buffer data delay estimator 822 estimates the delay for each group when a predetermined delay estimation period is satisfied, instead of estimating the delay for each group every time point of receiving the BSR message. That is, although the BSR message is received from the UE, if it is not the delay estimation period, the buffer data delay estimator 822 performs only an operation of increasing a previously estimated delay instead of estimating a delay for each group. The buffer data delay estimator 822 groups the size of the buffer data into a plurality of groups based on a delay estimation time point when the BSR message is received and estimates a delay for each group using a delay estimation execution time interval.

Figure 9:
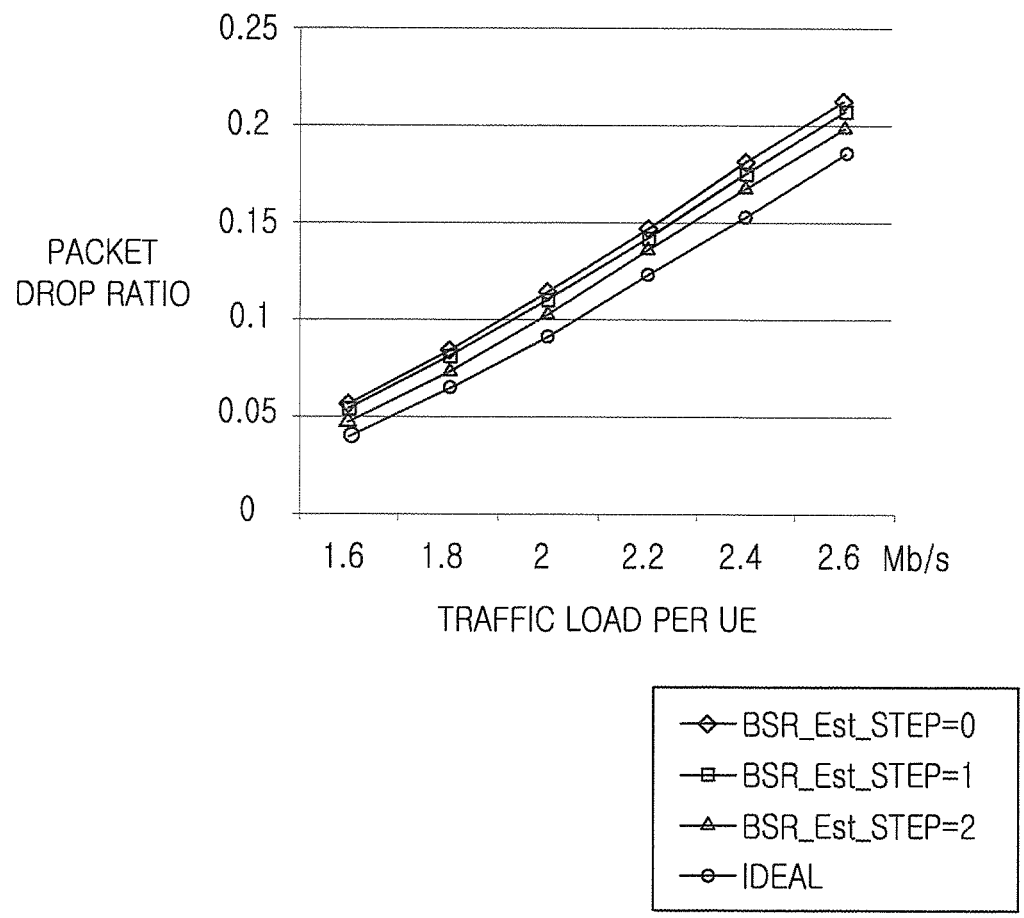
FIGS. 9 and 10 are graphs illustrating performance of estimating a delay of buffer data of a UE according to embodiments of the present invention.
Figure 10:
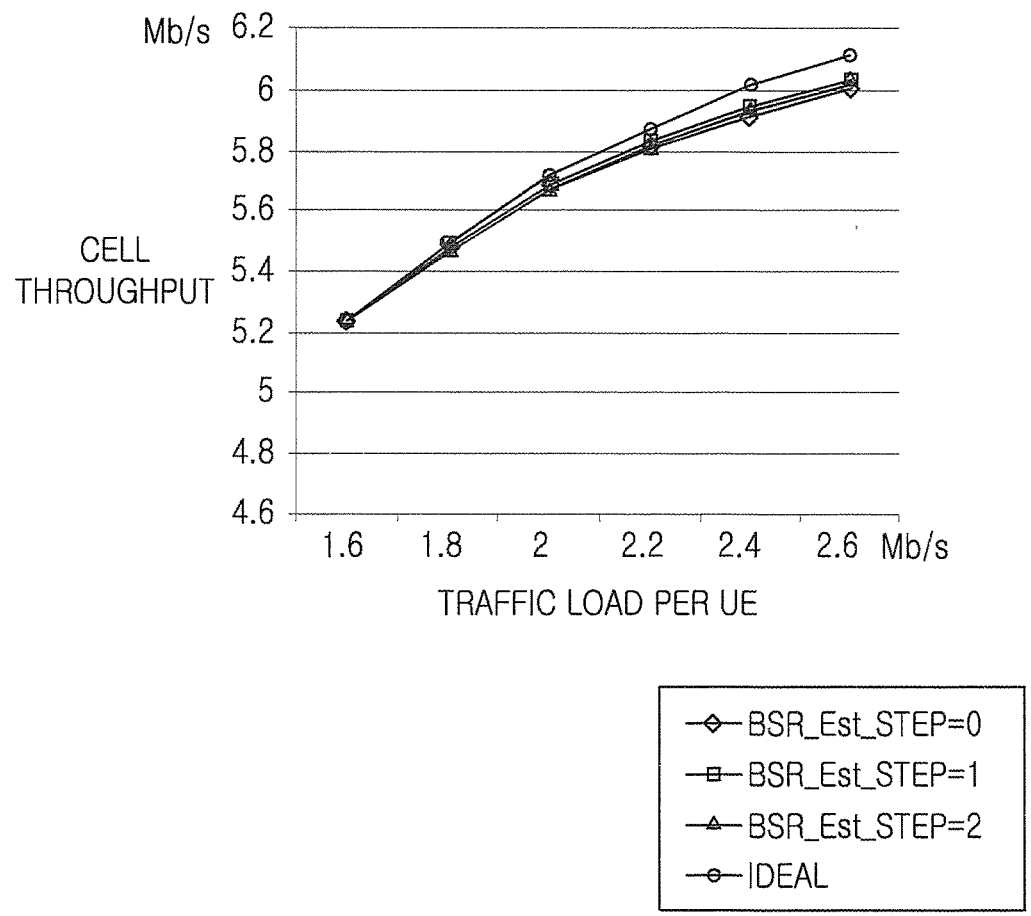

FIGS. 9 and 10 are graphs illustrating performance of estimating a delay of buffer data of a UE according to embodiments of the present invention. FIGS. 9 and 10 illustrate the results of conducting the experiment during 10,000 TTIs, assuming that three sectors per one eNB exist and three UEs per each sector are uniformly distributed in an environment in which nineteen eNBs are installed with two tiers of a hexagonal form. Here, shown are the result of ideally estimating a delay of buffer data of a UE and the experimental result of grouping the size of buffer data into a plurality of groups and estimating a delay for each group according to the present invention. Here, 'BSR_Est_Step=0' denotes a situation for not grouping the size of the buffer data of the UE, 'BSR_Est_Step=1' denotes a situation for grouping the size of the buffer data of the UE into two groups, and 'BSR_Est_Step=2' denotes a situation for grouping the size of the buffer data of the UE into three groups.

FIG. 9 illustrates a packet drop ratio dependent on a traffic load per UE, and FIG. 10 illustrates a cell throughput dependent on a traffic load per UE. In FIGS. 9 and 10, it may be appreciated that, when estimating the delay of the buffer data of the UE according to the present invention, it shows performance similar to that of ideally estimating the delay. Particularly, it may be appreciated that, as the size of the buffer data of the UE is grouped into many groups, the packet drop ratio shows performance similar to that of ideally estimating the delay.

As described above, embodiments of the present invention have an effect of, by grouping the size of buffer data of a UE depending on a time point of estimating a delay of the buffer data of the UE and estimating a delay of buffer data corresponding to each group using a time interval of delay estimation for the buffer data of the UE, being capable of decreasing an error of delay estimation for the buffer data of the UE in an eNB of a mobile communication system and, accordingly, being capable of efficiently performing scheduling for each UE in the eNB.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for estimating a delay of buffer data of a User Equipment (UE) in an evolved Node B (eNB) of a mobile communication system, the method comprising:
   receiving a message comprising a size of buffer data from the UE;
   determining each size of the buffer data of a plurality of groups; and
   estimating a delay for each of the plurality of groups based on arrival times of the message and prior messeges E.

2. The method of claim 1, further comprising, after receiving the message comprising the size of the buffer data:
   determining whether a predetermined delay estimation condition is satisfied; and
   when the predetermined delay estimation condition is satisfied, performing a procedure of delay estimation for each of the plurality of groups.

3. The method of claim 2, further comprising, when the predetermined delay estimation condition is not satisfied, increasing a previously estimated delay for each of the plurality of groups.

4. The method of claim 3, wherein increasing the previously estimated delay comprises increasing the previously estimated delay based on at least one of a difference between a previous delay estimation time point and a current time point and a Transmission Time Interval (TTI) lapsing from the previous delay estimation time point.

5. The method of claim 2, wherein determining whether the predetermined delay estimation condition is satisfied comprises:
   comparing a difference between a current time point and a previous delay estimation time point with a delay estimation period; and
   when the difference is greater than or equal to the delay estimation period, determining that the predetermined delay estimation condition is satisfied and, when the difference is less than the delay estimation period, determining that the predetermined delay estimation condition is not satisfied.

6. The method of claim 1, wherein determining the each size of the buffer data of the plurality of groups comprises determining the each size of the buffer data of the plurality of groups based on a delay estimation time point at every time point of receiving the message comprising the size of the buffer data from the UE.

7. The method of claim 6, wherein the plurality of groups comprise one or more groups indicating the size of buffer data received before and remaining without being scheduled until a current time point and one group indicating the size of buffer data newly generated at the current time point.

8. An apparatus for estimating a delay of buffer data of a User Equipment (UE) in an evolved Node B (eNB) of a mobile communication system, the apparatus comprising:
   a transmitter/receiver configured to receive a message comprising a size of buffer data from the UE; and
   a scheduler configured to determine each size of the buffer data of a plurality of groups and estimate a delay for each of the plurality of groups based on arrival times of the message and prior messages.

9. The apparatus of claim 8, wherein, if the message comprising the size of the buffer data is received, the scheduler is further configured to determine whether a predetermined delay estimation condition is satisfied and perform a procedure of delay estimation for each of the plurality of groups when the predetermined delay estimation condition is satisfied.

10. The apparatus of claim 9, wherein the scheduler is further configured to increase a previously estimated delay for each of the plurality of groups when the predetermined delay estimation condition is not satisfied.

11. The apparatus of claim 10, wherein the scheduler is further configured to increase the previously estimated delay based on at least one of a difference between a previous delay estimation time point and a current time point and a Transmission Time Interval (TTI) lapsing from the previous delay estimation time point.

12. The apparatus of claim 9, wherein, when determining whether the predetermined delay estimation condition is satisfied, the scheduler is further configured to compare a difference between a current time point and a previous delay estimation time point with a delay estimation period, determine that the predetermined delay estimation condition is satisfied when the difference is not less than the delay estimation period, and determine that the predetermined delay estimation condition is not satisfied when the difference is less than the delay estimation period.

13. The apparatus of claim 8, wherein the scheduler is further configured to determine the each size of the buffer data of the plurality of groups based on a delay estimation time point at every time point of receiving the message comprising the size of the buffer data from the UE.

14. The apparatus of claim 13, wherein the plurality of groups comprise one or more groups indicating the size of buffer data received before and remaining without being scheduled until a current time point and one group indicating the size of buffer data newly generated at the current time point.

15. An apparatus for estimating a delay of buffer data of a User Equipment (UE) in an evolved Node B (eNB) of a mobile communication system, the apparatus comprising:
   a transceiver configured to receive a message comprising a size of buffer data from the UE;
   a scheduler configured to perform scheduling for UEs receiving services from the eNB; and
   a buffer data delay estimator in the scheduler configured to determine each size of the buffer data of a plurality of groups and estimate a delay for each of the plurality of groups based on arrival times of the message and prior messages.

16. The apparatus of claim 15, wherein, if the message comprising the size of the buffer data is received, the buffer data delay estimator is further configured to determine whether a predetermined delay estimation condition is satisfied and perform a procedure of delay estimation for each of the plurality of groups when the predetermined delay estimation condition is satisfied.

17. The apparatus of claim 16, wherein, when the predetermined delay estimation condition is not satisfied, the buffer data delay estimator is configured to increase a previously estimated delay for each of the plurality of groups based on at least one of a difference between a previous delay estimation time point and a current time point and a Transmission Time Interval (TTI) lapsing from the previous delay estimation time point.

18. The apparatus of claim 16, wherein, when determining the predetermined delay estimation condition is satisfied, the buffer data delay estimator is further configured to compare a difference between a current time point and a previous delay estimation time point with a delay estimation period, determine that the predetermined delay estimation condition is satisfied when the difference is not less than the delay estimation period, and determine that the predetermined delay estimation condition is not satisfied when the difference is less than the delay estimation period.

19. The apparatus of claim 16, wherein the buffer data delay estimator is further configured to determine the each size of the buffer data of the plurality of groups based on a delay estimation time point at every time point of receiving the message comprising the size of the buffer data from the UE.

20. The apparatus of claim 19, wherein the plurality of groups comprise one or more groups indicating the size of buffer data received before and remaining without being scheduled until a current time point and one group indicating the size of buffer data newly generated at the current time point.

* * * * *